ing the reaction, until the reaction has gone to completion, adjusting the pH of the reaction medium within the range of about 2.0 to about 4.5 and thereafter washing the resultant starch ether with water to purify the same, the
United States Patent Office 2,928,827
Patented Mar. 15, 1960

2,928,827

PREPARATION OF PROPIONAMIDE ETHERS OF STARCH

Eugene F. Paschall, Orland Park, Ill., assignor to Corn Products Company, a corporation of Delaware No Drawing. Application May 9, 1958
Serial No. 734,101

2 Claims. (Cl. 260—233.3)

This invention relates to an improvement for making starch ethers in granule form from starch and acrylamide in aqueous medium.

Unswollen, granule propionamide ethers of starch having a D.S. above about 0.08 cannot be prepared in a water medium unless a gelatinization inhibitor is present. Sufficient swelling of the starch granule occurs during the etherification reaction to make it impossible to purify the product without resorting to recovery with expensive organic solvents.

In copending application Serial No. 711,769, filed January 29, 1958, a method is described for preparation of propionamide starch ethers in unswollen granule state having a D.S. as high as 0.4. This method involves reacting starch and acrylamide in aqueous medium in the presence of an alkaline catalyst and a salt such as NaCl, $Na_2SO_4$, $K_2SO_4$, $Na_2CO_3$. The presence of salts, particularly $Na_2SO_4$, not only inhibits gelatinization but also retards hydrolysis of propionamide groups to carboxyethyl groups thus making it possible to prepare propionamide ethers of starch having a relatively high D.S. value and at the same time having generally less than one carboxyethyl group per 100 anhydroglucose units (0.01 D.S.). That is, substantially pure propionamide ethers of starch are obtained.

Although it is possible to prepare propionamide ethers of starch in granule form and having a D.S. as high as about 0.4, it is virtually impossible to purify, by simply washing with water, products having a D.S. above about 0.08 if prepared in the absence of a gelatinization inhibitor and above about 0.2 if employing a saturated solution of $Na_2SO_4$ to prevent gelatinization of starch and hydrolysis of propionamide groups. Washing with water is the cheapest and most desirable method of purification. Detrimental swelling of the starch ether granules occurs during washing, making it impractical to purify the product by washing and filtration; a highly swollen layer of the starch ether forms on the surface of the filter cake restricting further passage of water. Furthermore, after air drying, the swollen product is difficult to redisperse in water.

It is an object of this invention to provide a new and improved method of preparing and recovering, in granule form, salt free propionamide ethers of starch having a D.S. within the range of about 0.08 to 0.40. A further object is to prepare such ethers containing substantially no carboxyethyl groups. Other objects will appear hereinafter.

The aforementioned objects may be accomplished by reacting starch with acrylamide under non-gelatinizing conditions in an aqueous medium containing a specific quantity of alkali and sufficient sodium sulfate both to prevent starch granule swelling and to minimize hydrolysis of propionamide groups to carboxyethyl during the reaction, until the reaction has gone to completion, adjusting the pH of the reaction medium within the range of about 2.0 to about 4.5 and thereafter washing the resultant starch ether with water to purify the same, the amount of alkali should be not more than 0.1 mole per mole of starch and preferably not more than about 0.06 mole to obtain products which are most easily purified. Experiment 10, in Example 1 below, shows that when 0.1 mole of NaOH is used to prepare 0.34 D.S. propionamide ether of starch, the product is more difficult to filter than the 0.34 D.S. product of Experiment 12 in which 0.06 mole NaOH was used. Other alkaline materials should be used in amounts equivalent to the amount of NaOH specified.

In carrying out this invention, it is essential that starch granule swelling during the etherification reaction be prevented to as great a degree as possible. A propionamide starch ether which has undergone significant granule swelling during reaction cannot be successfully treated by means of the present invention.

The amount of sodium sulfate necessary to prevent detrimental starch granule swelling increases with the D.S. of the product, alkali concentration and reaction temperature. The rate of hydrolysis of propionamide groups to carboxyethyl groups increases with alkali concentration and reaction temperature and decreases with increased concentration of sodium sulfate. Since the above variables are interdependent, considerable variation in any or all of the variables is possible in maintaining non-gelatinizing conditions. The amount of sodium sulfate may vary from about 0.05 mole to per mole of starch for 0.08 D.S. product to an amount required to saturate the reaction mixture for preparation of a 0.4 D.S. product. Actually, there is no harm in using more than enough sodium sulfate to saturate the reaction medium but the excess serves no useful purpose.

The starch ethers prepared in accordance with my invention are unique. It is well known to those skilled in the art that gelatinized sols of charged starch derivatives known in the past, either positive or negative, are sensitive toward salts. For example, a solution of carboxymethyl starch or quaternary ammonium starch ether undergoes a reduction in viscosity in the presence of either NaCl or $Na_2SO_4$. This salt sensitivity is particularly objectionable for certain uses requiring highly viscous, stable starch sols containing salts. A high viscosity, clear, and stable starch sol which will tolerate salts is desired in textile printing gums. Similar characteristics are desirable in starches used as oil well drilling mud adjuncts and in fire proofing preparations for fabrics consisting of starch and ammonium sulfate and the like.

It has been found that gelatinized pastes of propionamide starch ethers substantially free of carboxyethyl groups are unusually stable in the presence of salts. Furthermore, a product which has a carboxyethyl D.S. of about 0.025 and a propionamide D.S. of 0.025 has both the aforementioned desirable viscosity and clarity characteristics even in the presence of substantial amounts of a variety of salts.

The following examples will further illustrate the invention and are to be considered for such purposes only and not in any sense limiting the invention.

EXAMPLE 1

This example compares the effect of using an acid pH, when purifying with water, propionamide ethers of starch having a D.S. ranging from 0.1 to 0.4 in accordance with the present invention with the effect of using a pH of 7.0. Pertinent data are presented in Table I below. The following procedure is typical of the experiments shown in Table I:

One mole of starch (162 grams, dry basis) was slurried in 200 ml. of water containing 0.56 mole of sodium sulfate and the amount of acrylamide shown in Table I. Then 0.06 (0.1 mole in Experiment 10) of sodium hydroxide in 50 ml. of water was added to the slurry. The slurry was transferred to a reaction flask equipped for agitation and the slurry stirred 16 hours at 50° C. The pH of the mixture was adjusted to 3.0 with 0.09 mole of hydrochloric acid. The product was filtered by vacuum on an 18 cm. Buchner filter and the filter cake was washed with one liter of distilled water. The time required to pass one liter of water through the filter cake was 7½ minutes. After being air dried to 12 percent moisture content, the product was analyzed for nitrogen and carboxyl contents.

The data in Table I show that by carrying out the reaction under non-gelatinizing conditions and adjusting the pH of the reaction mixture to 3.0, the maximum propionamide D.S. at which the product can be purified by washing with water is doubled. It is also apparent from comparing Experiments 2 and 7 with 1 and 6, respectively, that the presence of sodium sulfate in the reaction medium prevents both starch gelatinization and propionamide hydrolysis during the reaction.

*Table I.—Preparation and purification of 0.1–0.4 D.S. starch propionamide ethers in 16-hour, 50° C. reaction*

| Exp. No. | Acryl- amide, Mole | Na₂SO₄, Mole | NaOH, Mole | Adjusted pH | Wash Time, Min/Liter H₂O | Propion- amide, D.S. | Carboxy- ethyl, D.S. |
|---|---|---|---|---|---|---|---|
| 1 | 0.167 | 0.56 | 0.06 | 7.0 | 8:46 | 0.10 | 0.007 |
| 2 | 0.167 | None | 0.06 | 3.0 | Gelatinized | 0.10 | 0.02 |
| 3 | 0.33 | 0.56 | 0.06 | 7.0 | 18:57 | 0.18 | 0.01 |
| 4 | 0.33 | 0.56 | 0.06 | 3.0 | 8:54 | 0.17 | 0.009 |
| 5 | 0.50 | 0.56 | 0.06 | 7.0 | 27:25 | 0.23 | 0.008 |
| 6 | 0.50 | 0.56 | 0.06 | 3.0 | 7:28 | 0.24 | 0.008 |
| 7 | 0.50 | None | 0.06 | 3.0 | Gelatinized | 0.24 | 0.026 |
| 8 | 0.667 | 0.56 | 0.06 | 7.0 | 45:00 | 0.31 | 0.01 |
| 9 | 0.667 | 0.56 | 0.06 | 3.0 | 13:51 | 0.30 | 0.009 |
| 10 | 0.667 | 0.56 | 0.10 | 3.0 | 24:00 | 0.34 | 0.027 |
| 11 | 0.75 | 0.56 | 0.06 | 7.0 | Gelatinized | 0.34 | 0.01 |
| 12 | 0.75 | 0.56 | 0.06 | 3.0 | 16:36 | 0.34 | 0.01 |
| 13 | 0.83 | 0.56 | 0.06 | 3.0 | 32:16 | 0.41 | 0.01 |

EXAMPLE 2

The procedure of Example 1 was followed for the preparation of a 4 mole batch of 0.3 D.S. starch propionamide ether using 0.5 mole of acrylamide per mole of starch. After the reaction the slurry was divided into 4 aliquots of one mole starch derivative each. Each aliquot was acidified to the pH shown in Table II, filtered and the filter cake washed with one liter of water as described in Example I.

The data show that this propionamide ether can be washed without detrimental granule swelling if the pH of the slurry is in the range of about 2.0 to 4.5. The rate of filtration, however, is greatest when the pH of the slurry is about 3.0, at this pH starch granule swelling is at a minimum.

*Table II*

| Exp. No. | Acryl- amide, M/M Starch | Na₂SO₄, M/M Starch | NaOH, M/M Starch | Adjusted pH | Wash Time Per Liter H₂O (Min:Sec) | Propion- amide, D.S. | Carboxy- ethyl, D.S. |
|---|---|---|---|---|---|---|---|
| 1 | 0.5 | 0.56 | 0.06 | 4.5 | 11:46 | 0.3 | 0.019 |
| 2 | 0.5 | 0.56 | 0.06 | 3.0 | 7:26 | 0.3 | 0.019 |
| 3 | 0.5 | 0.56 | 0.06 | 2.5 | 8:56 | 0.3 | 0.019 |
| 4 | 0.5 | 0.56 | 0.06 | 2.0 | 10:15 | 0.3 | 0.019 |

I claim:

1. A process for making and recovering propionamide ethers of starch having a D.S. of about 0.1 to about 0.4, in unswollen granule state which comprises reacting starch, under non-gelatinizing and non-swelling conditions, with acrylamide in aqueous medium containing alkali and sodium sulfate, adjusting the pH of the reaction mixture, after completion of the reaction, to within the range of about 2.0 to about 4.5, and washing the starch ether with water, and recovering the washed starch ether; the amount of alkali not exceeding 0.1 mole per mole of starch and the amount of sodium sulfate being at least 0.05 mole per mole of starch.

2. Process according to claim 1 wherein the alkali is sodium hydroxide.

References Cited in the file of this patent
UNITED STATES PATENTS

| | | |
|---|---|---|
| 2,338,681 | Bock et al. | Jan. 4, 1944 |
| 2,618,633 | Vaughan | Nov. 18, 1952 |
| 2,858,305 | Kerr | Oct. 28, 1958 |